Oct. 14, 1969  A. G. LONDON  3,472,547
SAFETY TILT SYSTEM
Filed June 13, 1966  3 Sheets-Sheet 1

INVENTOR
Alvan G. London
BY Robillard & Byrne
ATTORNEYS

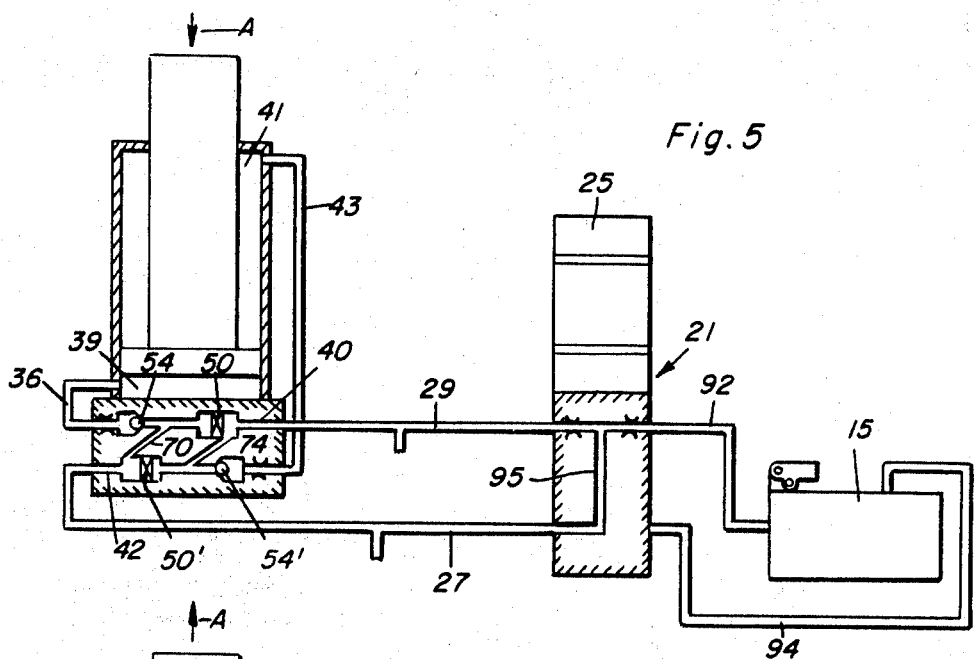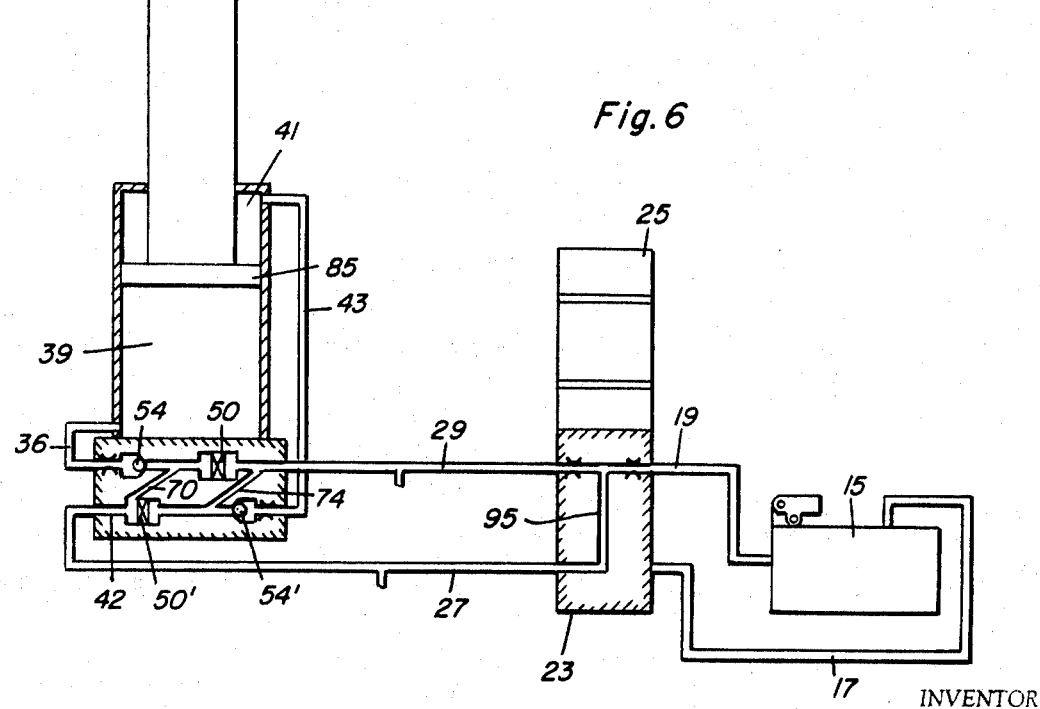

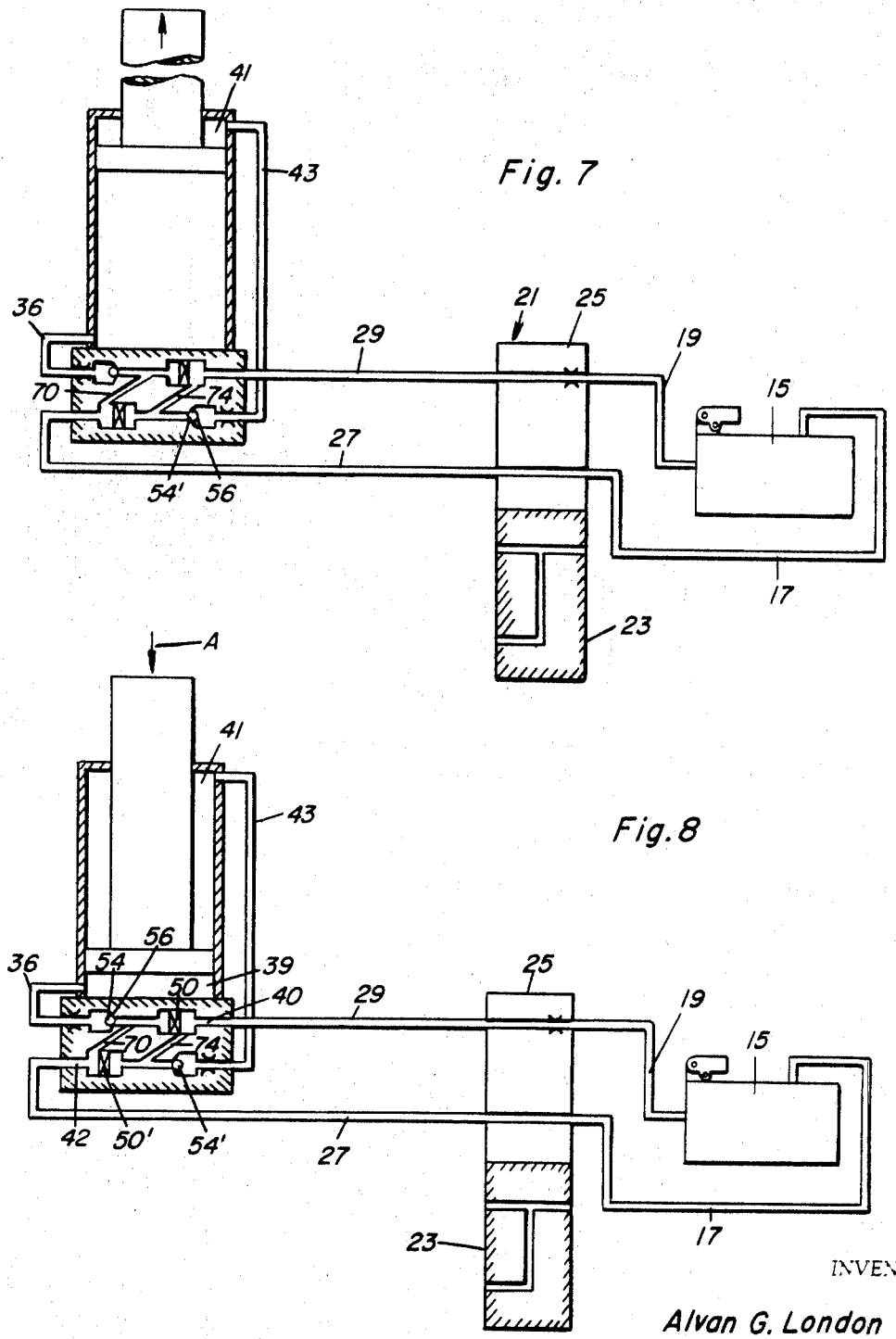

United States Patent Office 3,472,547
Patented Oct. 14, 1969

3,472,547
SAFETY TILT SYSTEM
Alvan G. London, Fox Point, Wis., assignor to Applied Power Industries, Inc., Milwaukee, Wis., a corporation of Wisconsin
Filed June 13, 1966, Ser. No. 557,287
Int. Cl. B62d 27/06, 39/00
U.S. Cl. 296—28
3 Claims

ABSTRACT OF THE DISCLOSURE

A safety tilt system for a pivoted cab mounted on a motor vehicle frame, including a double acting jack pivotally connected to said frame and cab to tilt said cab and safety valve means adapted to hold the cab in any pivoted position in the event that a loss of hydraulic pressure is encountered.

This invention relates generally to a hydraulic system which is manually operated and has a means to prevent injury to personnel and equipment upon an unexpected failure in the system.

Although the embodiment described herein is for use in a hydraulic system for raising and lowering the cab of a cab-over-engine type vehicle, it will be understood by those skilled in the art that the system encompassed by this invention has other uses in similar environments. A more particular objective of this invention therefore is to provide a hydraulic system for a cab-over-engine vehicle with full safety throughout a full 90° swing of the cab.

Another important objective of this invention is to provide a manually operated hydraulic power system which is not dependent in any way upon the battery or other power systems of the vehicle.

Further objectives of the invention are to provide a hydraulic tilting assembly with built-in hydraulic safety for eliminating the hazards of accidental cab fall, accidents occurring when the vehicle is in motion and accidents resulting from loss of cab control under any circumstance.

These and other objects of the invention will become more apparent to those skilled in the art by reference to the following detailed description when viewed in light of the accompanying drawings, wherein like elements throughout the figures thereof are indicated by like numerals and wherein:

FIGURES 5–8 are diagrammatic sketches showing circuit operation as particular forces are applied to the system.

Figure 1:
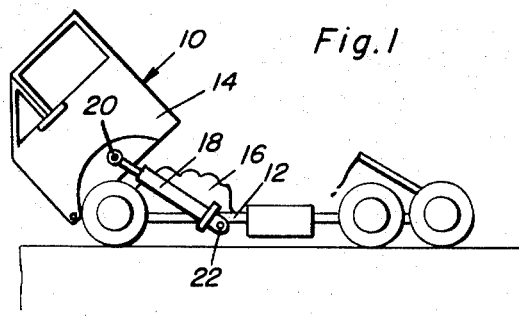
FIGURE 1 is a diagrammatic view of a vehicle of the type with which this invention can be used with the cab at a 45° tilt.
Figure 2:
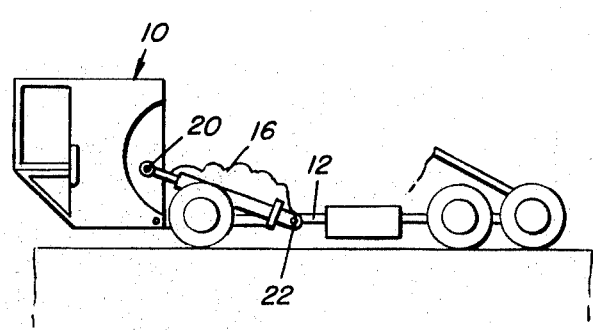
FIGURE 2 is an elevation view similar to FIGURE 1 wherein the cab is tilted to its full 90° position.

Referring now more particularly to the drawings wherein like numerals indicate like parts, the numeral 10 indicates a cab-over-engine vehicle with which this invention may be used efficiently. The vehicle is of a type having a frame 12 and a pivoting cab 14 which encloses an engine 16. By way of a pair of double acting hydraulic jacks 18 (one not shown, but disposed on the opposite side of the truck shown in FIGURES 1 and 2) having their bases pivotally secured to the frame 12 about points 22 and their piston ends connected to the cab 14 at points 20, the cab is movable from its vertical position to a 45° (over-center) position shown in FIGURE 1 and thence to a 90° full-tilt position as shown in FIGURE 2. Thus, the hydraulic jacks 18 are in their nested position when cab 14 is in its normal drive position and in their full expanded position when the cab is disposed at the 90° position. The structure of only one jack will be described hereinafter.

Figure 3:
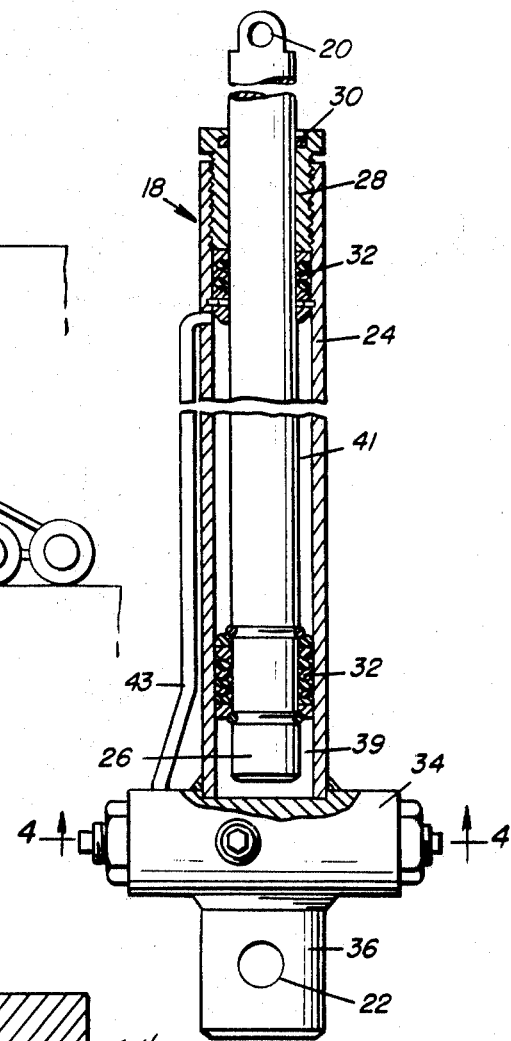
FIGURE 3 is a cross-section of a hydraulic cylinder used with this invention.

As best seen in FIGURE 3, the hydraulic jack 18 is comprised of a cylinder 24 having a piston 26 slidably received therein. The outer end of the cylinder is suitably sealed with a gland nut 28 and an annular sealing ring 30. The piston 26 is stabilized within the cylinder 24 and the expansion chambers separated from one another by way of the conventional chevron type sealing ring assemblies 32. A valve housing 34 forms the base of the cylinder 18. Extending from the outer face of housing 34 is a lug member 36 by which the hydraulic jack is pivotally secured to the frame of the vehicle at point 22.

The hydraulic jacks are powered by the system diagrammatically shown in FIGURES 5–8. The system includes a pump housing 15 which includes a conventional pumping apparatus and fluid reservoir. The conduit leading to the reservoir is indicated by the number 17 and the conduit from the pumping chamber is indicated by the number 19. The conduits are led to a valve member 21 having an "up" position 23 and a "down" position 25. The fluid from the valve 21 is led to and from the valve housing 34 by way of conduits 27 and 29.

Referring back to FIGURE 4, it can be seen that the valve housing 34 has two similar and parallel passageways 40 and 42 extending throughout its length. One end of passageway 40 is communicated with the lower compression chamber 39 of jack 18 by aperture 36'. The corresponding end of passageway 42 is communicated with the upper compression chamber 41 by conduit 43.

With the exception of the difference caused by the ability to communicate passageway 40 to lower chamber 39 by an aperture and the necessity to communicate passageway 42 to chamber 41 via conduit 43, the passageways 40 and 42 are substantially identical and have identical parts. The corresponding elements along passageway 42 are indicated by the same numerals as applied to the elements along passageway 40 with the addition of prime marks. A cap member 46 is slidably received in passageway 40 and is biased into position by way of a coil spring 48 which abuts against the fitting connecting conduit 29 to the housing 34. A plunger 50 extends longitudinally of the passageway and is part of the cap member 46. The plunger 50 is adapted to displace a check ball 54 from its seat 56 against the bias of a spring 58. That end of passageway 40 which is closed by plug member 60 includes a screen and spring arrangement similar to that indicated as 64' but such an arrangement is not shown so that aperture 36 can be seen.

A passageway 70 communicates the pump pressure in conduit 27 to the chamber 72 in passageway 40 and a passageway 74 communicates the pressures to the chamber 76 of passageway 42 to the fluid pressures in conduit 29.

Figure 4:
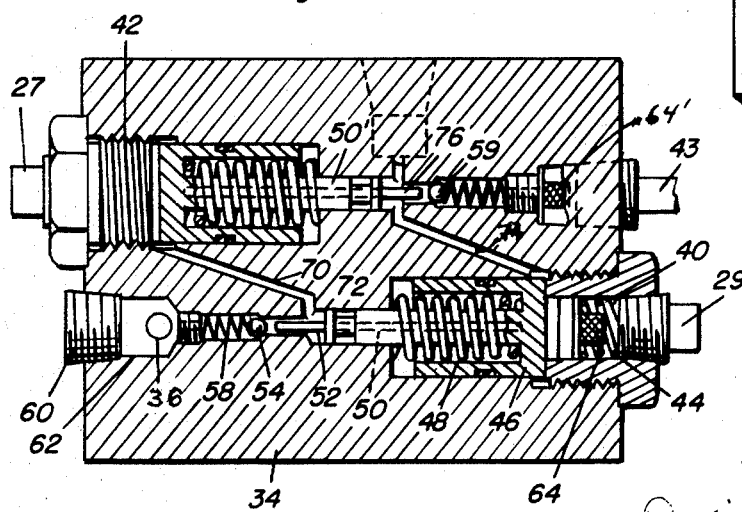
FIGURE 4 is a cross sectional view along the line 4—4 of FIGURE 3.

Described briefly, it can be seen in FIGURE 4 that when an increased pressure is present in conduit 29, it is immediately reflected through passageway 74 to chamber 76. The same pressure will move the cap member 46 toward the ball 54 and displace it from seat 56 against the bias of spring 58. This permits fluid to enter the chamber 39 through aperture 36. Of course any loss in pressure, either through conduit 27 or 29 will immediately cause the springs 48 and 48' to retract cap members 46 and 46'; thus locking the fluid in expansion chambers 39 and 41 freezing cab 14 at exactly the attitude it was when the loss of pressure occurred.

The above-described valving is conveniently disclosed diagrammatically by FIGURES 5–8 and its operation better understood when taken with the forces applied by the other elements in the system.

FIGURE 5 discloses the condition present in stroking the cab from its 0° position to just prior to reaching an over-center 45° position. During this movement, the cab weight tends to nest the jack as shown by the arrow A. The valve is in its "UP" position 23. As the pump is stroked, fluid pressure is increased in each of the conduits 27 and 29 since they are communicated via passageway 95 of valve 21. The plunger 50 unseats ball 54 permitting fluid in line 27 to enter chamber 39 through passageway 70 and aperture 36. At the same time, the increase in pressure causes plunger 50' to unseat ball 54' permitting fluid from chamber 41 to exhaust through conduit 43 and passageway 74 and thence through 42 and into the expanding chamber 39 through conduit 36. Since chamber 39 is larger than chamber 41 because of the piston arm displacement additional oil is received through conduit 29. In the event of a drop in pressure in either line 27 or 29, the balls 54 and 54' return to their seats and freeze the cab at its position at the time of the loss.

As the cab traverses the over-center position, its weight tends to expand jack 18. Note arrow A in FIGURE 6, which figure discloses the condition between 45° and the 90° full-tilt position. In this position, the chamber 41 becomes a pressure chamber working to hold ball 54' against its seat. However, as the pump is stroked, sufficient pressure develops to displace both the balls 54 and 54', thereby permitting fluid from chamber 41 to flow into chamber 39 and fluid from the pump to enter chamber 39. As each pumping stroke is completed, the pressure in chamber 41 will maintain ball 54' against its valve seat and the pressure in conduit 29 will be insufficient to displace the ball 54. Therefore, each pumping stroke permits the ball 54 to remain against its seat. It can be readily seen that any drop in pressure in lines 27 and 29 will freeze the cab in its present attitude.

FIGURE 7 is that condition in which the valve 21 is placed in its "DOWN" position 25 and it is desired to return the cab from the position of FIGURE 2 to the normal drive position. FIGURE 7 discloses operation and the application of forces until the cab returns to the over-center position. In this instance, the line 27 is communicated with the reservoir. With each pumping stroke, the pressure in conduit 29 displaces the ball 54, permitting fluid to leave chamber 39 through aperture 36 through passageway 70 and conduit 27. In addition, the pressure in conduit 29 through passageway 74, displaces the ball 54' and fluid is pumped into chamber 41 via conduit 43. Therefore, during each pumping stroke, the ball 54' moves back and forth with each pumping stroke.

The last situation is when the valve is disposed in its "DOWN" position 25 and the cab has just traversed the over-center position and is moving toward its normal position. This situation is shown in FIGURE 8. Here again, the cab is now exerting a downward pressure, as indicated by Arrow A. It is also desired to permit the piston to go downwardly. In this instance, with each pumping stroke, ball 54 is displaced, permitting fluid from chamber 39 to exhaust through passageway 70 and conduit 27. Oil proceeds to expansion chamber 41 through passageway 74, valve seat 56' and conduit 43.

It can be seen that there has been described a hydraulic system that insures complete safety automatically even though the pressures to which the system are subjected vary throughout its cycle of operation.

What has been set forth above is intended primarily as exemplary to enable those skilled in the art in the practice of the invention and it should therefore be understood, that, within the scope of the appended claims, the invention may be practiced in other ways than as specifically described.

What is new and therefore desired to be protected by Letters Patent of the United States is:

1. A motor vehicle having an elongated frame, a cab, means pivotally mounting said cab on said frame about an axis transverse to the longitudinal axis of said frame, at least one double-acting jack having a cylinder end connected to said frame and a piston end connected to said cab for moving said cab to a first normally lowered position, to a second partially raised 45° position and to a third fully raised 90° forwardly tilted position, said cab urging said piston cylinder to nest when between said first and second positions and urging said piston-cylinder to expand when between said second and third positions, a valve housing enclosing one end of said cylinder, a pump, a reservoir, first conduit means connecting said cylinder to said valve housing, and second conduit means connecting said pump and said reservoir to said valve housing, second means in said valve housing causing said piston cylinder to remain fixed against contraction movement upon a loss of hydraulic pressure when said cab is between said first and second positions and fixed against expansion upon a loss of hydraulic pressure when said cab is between said second and third positions.

2. The invention as described in claim 1 wherein said first conduit means comprises a first conduit leading from said valve housing to said one end of said cylinder and a second conduit leading from said valve housing to the other end of said cylinder, and said second conduit means comprises a third conduit leading from said pump to said valve housing and a fourth conduit leading from said reservoir to said valve housing.

3. The invention as described in claim 2 wherein said second means comprises a first passageway in said valve housing connecting said second and third conduits, a second passageway in said valve housing connecting said first and fourth conduits, a first check valve member at the juncture of said second conduit with said valve housing and normally blocking flow in said first passageway, a second check valve member at the juncture of said first conduit with said valve housing and normally blocking flow in said second passageway, a first plunger responsive to pressure in said fourth conduit to unseat said first check valve member and a second plunger responsive to pressure in said third conduit to unseat said second check valve member.

References Cited

UNITED STATES PATENTS

| 1,955,154 | 4/1934 | Temply | 91—420 X |
| 2,269,835 | 1/1942 | Wallace et al. | 254—93 |
| 2,306,348 | 12/1942 | Spear | 180—89 |
| 2,939,541 | 6/1960 | Smalley | 180—89 |

OTHELL M. SIMPSON, Primary Examiner

U.S. Cl. X.R.

91—420; 180—89; 254—93